(12) United States Patent
Chou et al.

(10) Patent No.: US 11,811,461 B2
(45) Date of Patent: Nov. 7, 2023

(54) CALIBRATION METHOD FOR A PHASED ARRAY OF ANTENNAS

(71) Applicant: NATIONAL TAIWAN UNIVERSITY, Taipei (TW)

(72) Inventors: Hsi-Tseng Chou, Taipei (TW); Jake Waldvogel Liu, Taipei (TW)

(73) Assignee: National Taiwan University, Taipei (TW)

( * ) Notice: Subject to any disclaimer, the term of this patent is extended or adjusted under 35 U.S.C. 154(b) by 216 days.

(21) Appl. No.: 17/149,913

(22) Filed: Jan. 15, 2021

(65) Prior Publication Data
US 2022/0229154 A1     Jul. 21, 2022

(51) Int. Cl.
*H04B 17/11*     (2015.01)
*H01Q 3/38*     (2006.01)

(52) U.S. Cl.
CPC ............ *H04B 17/11* (2015.01); *H01Q 3/38* (2013.01)

(58) Field of Classification Search
None
See application file for complete search history.

(56) References Cited

U.S. PATENT DOCUMENTS

| | | | | |
|---|---|---|---|---|
| 4,453,164 A | * | 6/1984 | Patton | H01Q 3/267 342/372 |
| 2017/0301988 A1 | * | 10/2017 | Schuman | H01Q 3/2605 |
| 2019/0238176 A1 | * | 8/2019 | Briand | H03F 3/68 |
| 2022/0352636 A1 | * | 11/2022 | Yetisir | H01Q 9/045 |

* cited by examiner

*Primary Examiner* — Whitney Moore
(74) *Attorney, Agent, or Firm* — Rosenberg, Klein & Lee

(57) ABSTRACT

A calibration method for a phased array of antennas, wherein the phased array of antennas comprises N antenna elements, the N antenna elements are decomposed into G sub-arrays, each of the G sub-arrays comprises M antenna elements, and the calibration method comprises: (a) inputting a set of digital control codes to RF devices in order to produce field signals corresponding to an operation order r to the G sub-arrays' radiations; (b) measuring the observation field signals of the G sub-arrays corresponding to the operation order r in a fixed position to produce a DFT relationship with respect to the RF devices' operations; and (c) repeating operations (a) to (b) corresponding to the operation order r from 1 to G for generating error-calibrating signals corresponding to the signals of the G sub-arrays.

14 Claims, 12 Drawing Sheets

CALIBRATION METHOD FOR A PHASED ARRAY OF ANTENNAS

BACKGROUND OF THE INVENTION

Field of the Invention

The present invention relates to a calibration method for a phased array of antennas, particularly to a calibration method for a beam-steering phased array of antennas.

Description of the Related Art

The radiation beams of a phased array of antennas are generated by a radio frequency (RF) beamforming network (BFN) formed by components including active gain control units (i.e., power amplifiers (PAs), low noise amplifiers (LNAs), attenuators, etc.), digital phase shifters (DPSs) and RF transmission lines. The active gain control units and DPSs are operated to produce excitation amplitudes and phases to excite the array of antennas. When the frequency band of applications, in which the BFN operates, becomes very high, the fabrication of BFN and antenna elements of the array of antennas may easily cause phase and amplitude errors in their outputs to excite the array of antennas and defect the radiation beam patterns and directions. Thus, a complicated process is needed to calibrate the phased array of antennas to achieve good radiation beams.

SUMMARY OF THE INVENTION

In order to overcome the abovementioned problem, the present invention provides an efficient calibration method for a phased array of antennas based on binary operations of DPSs in BFNs to form the format of discrete Fourier transformation (DFT) in the antenna radiations measured at a single field point of observation that is defined as the radiation boresight of the phased array of antennas. This calibration procedure results in a redefinition of amplitudes and phases for the RF devices and DPSs to embed the errors of amplitudes and phases in BFN into the new tables of binarily discretized amplitude and phase states of RF devices and DPSs for beam steering operation.

One of the goals of the present invention is to search the excitation errors in amplitudes and phases, output from the BFN and the antenna elements due to fabrication discrepancy. These errors can be compensated during the operation of the phased array of antennas by the gain control units and DPSs for equal amplitude and phase excitations to radiate a beam of maximum directivity at the selected fixed position of measurement.

In one embodiment, the element distribution of the phased array of antennas can be relatively arbitrary in complying to popular application designs. Thus, the distribution of antenna elements of the phased array of antennas can be either periodic or aperiodic, and can be either conformal or planar. It is not restricted to any one-dimensional (1-D), two-dimensional (2-D) or three-dimensional (3-D) spatial array configurations. In the calibration procedure, they are treated as a 1-D phased array of antennas by re-ordering their antenna elements' indices.

The present invention provides a calibration method for a phased array of antennas, wherein the phased array of antennas comprises N antenna elements. The N antenna elements are decomposed into G sub-arrays, where each of the G sub-arrays comprises M antenna elements. M is determined by the number of available phase states provided by DPSs. If N≠GM, then zero padding is performed to the leftover subarrays to ensure the condition of N=GM. The calibration method comprises:

(a) inputting a set of digital control codes to RF devices with binarily discretized output states (i.e., the discretized output states of the active gain control units and DPSs in the BFNs) to generate a set of excitation amplitudes and phases from the BFN with respect to the $r^{th}$ step in a sequential operation order for the G sub-arrays, and produce a set of M field signals at a selected fixed position measured from the M antenna elements' radiations;

(b) measuring M field signals of the M antenna elements' radiations with respect to the $r^{th}$ step in the sequential operation order at a selected fixed position to produce a DFT relationship with respect to the DPSs' M binary operations; and (c) repeating operations (a) to (b) corresponding to the operation step order r in the sequential operation order from 1 to G for generating excitations from the RF devices and DPSs in BFNs and obtaining the corresponding M field signals from the M antenna elements' radiations at the selected fixed position.

Specifically, the phased array of antennas is a 1-D, 2-D or 3-D array of antennas.

Specifically, the phased array of antennas is conformal or planar shaped.

Specifically, the phased array of antennas is periodic or aperiodic.

Specifically, the calibration method for the phased array of antennas further comprises:

(d) inputting another set of digital control codes to the RF devices to produce another set of M field signals at the selected fixed position from the M antenna elements of each of the G sub-arrays;

(e) repeating operations (a) to (d) and measuring signals M times to generate N (N=GM) field signals and find the N antenna error-calibrating signals associated with the RF paths in BFN.

Specifically, the calibration method for the phased array of antennas further comprises (f) inputting amplitude signals of excitations corresponding to the N antenna elements.

Specifically, the amplitude signals of excitations corresponding to the N antenna elements in operation (f) are represented by $A_{p,g}$ with p representing an index of the M antenna elements, where M is an integer, and g represents an index of the G sub-arrays. The amplitude errors of excitations due to fabrication and the antenna elements' radiations at the selected fixed position of measurement are all incorporated in $A_{p,g}$.

Specifically, the output phasors of DPSs' operations to generate the DFT signals corresponding to the M antenna elements of the G sub-arrays in operation (b) is represented with $$\exp\left(-i\frac{2\pi}{M}(p-1)(q-1)\right),$$

where p=1~M represents an index of the M antenna elements, and q=1~M is the index of radiation signal measurements at the selected fixed position.

Specifically, the output phasors of DPSs' operations to generate the DFT signals corresponding to the $r^{th}$ step in the sequential operation to the G sub-arrays in operation (c) is represented with $\exp(-i(r-1)(g-1)\Lambda)$, where g represents an index of the G sub-arrays (G is an integer), Λ represents a phase difference between adjacent sub-arrays of the G sub-arrays, Λ=(M/2−1)Δ, and Δ=2π/M.

Specifically, the complete output phasors of the DPSs' operation to generate the N DFT signals are $$e^{i\omega_{p,g}} = e^{-i\left\{\frac{2\pi}{M}(p-1)(q-1)\right\}} e^{-i(r-1)(g-1)\Lambda},$$

where q=1~M and r=1~G to measure the N DFT signals.

Specifically, the phasors of the error-calibrating signals corresponding to the G sub-arrays in operation (e) are represented by $e^{i\alpha_{p,g}}$, where p represents an index of the M antenna elements, and g represents an index of the G sub-arrays.

Specifically, the N DFT signals of the N antenna elements corresponding to the operation at the $r^{th}$ step are measured at a fixed position in operation (d), and are represented by $F_{co}(q,r)$. The discrete Fourier transform relationship is established by considering:

$$F_{co}(q, r) = \sum_{g=1}^{G} \sum_{p=1}^{M} (A_{p,g} e^{i\alpha_{p,g}}) e^{-i\left\{\frac{2\pi}{M}(p-1)(q-1)\right\}} e^{-i(r-1)(g-1)\Lambda},$$

DETAILED DESCRIPTION OF THE INVENTION

Below, the embodiments are described in detail in cooperation with the drawings to make easily understood the technical contents, characteristics and accomplishments of the present invention. The drawings are only to exemplify the present invention but not to limit the scope of the present invention.

Figure 1:
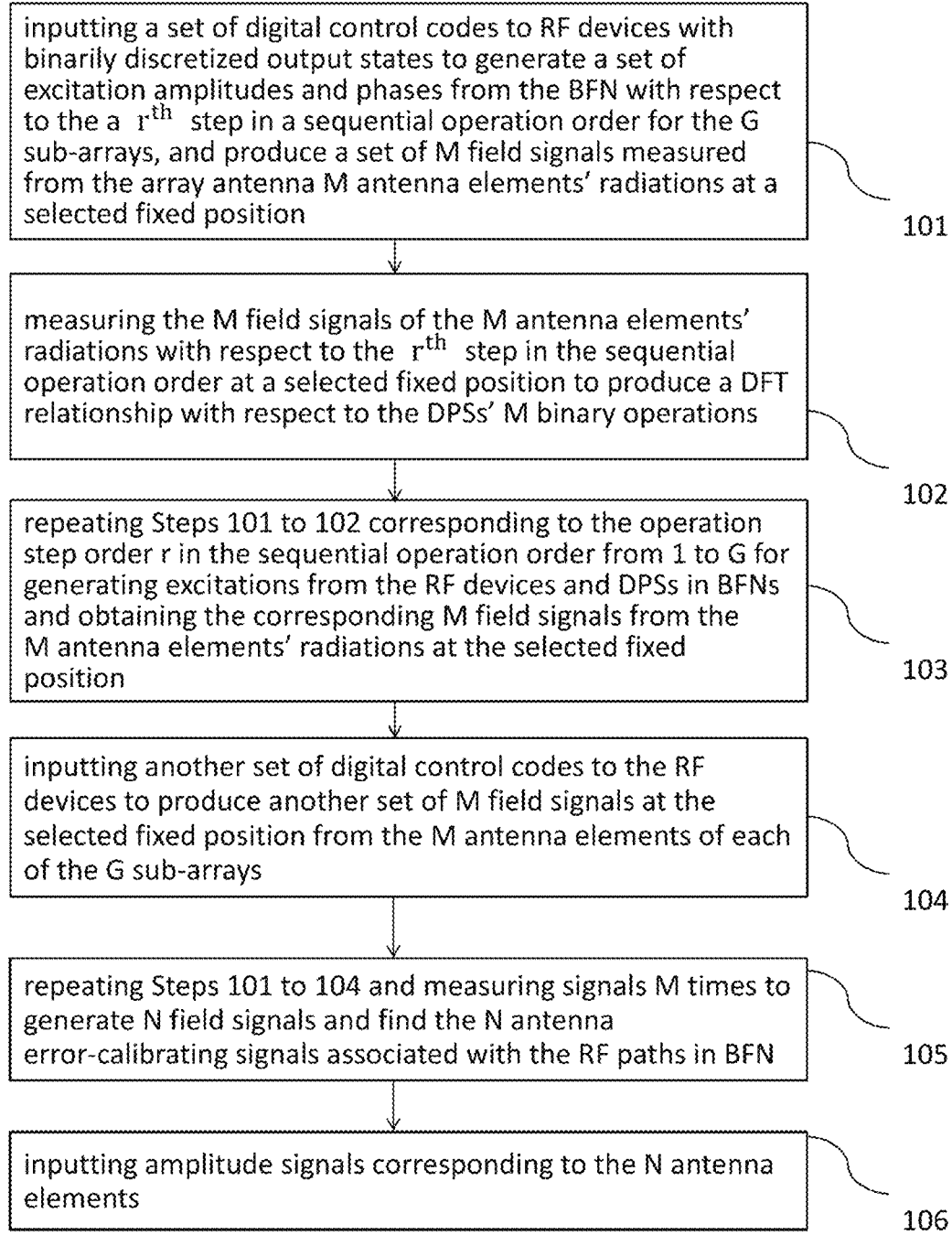
FIG. 1 is a flowchart of a calibration method for a phased array of antennas according to the present invention.

As illustrated in FIG. 1, the calibration method of the present invention comprises:

(a) inputting a set of digital control codes to RF devices with binarily discretized output states (i.e., the discretized output states of the active gain control units and DPSs in the BFNs) to generate a set of excitation amplitudes and phases from the BFN with respect to a $r^{th}$ step in a sequential operation order for the G sub-arrays, and produce a set of M field signals (e.g. single-observation field signals) measured from the M antenna elements' radiations at a selected fixed position, as shown in Step 101;

(b) measuring the M field signals (which can be either far-field or near-field signals) of the M antenna elements' radiations with respect to the $r^{th}$ step in the sequential operation order at a selected fixed position to produce a DFT relationship with respect to the DPSs' M binary operations, as shown in Step 102;

(c) repeating Steps 101 to 102 corresponding to the operation step order r in the sequential operation order from 1 to G for generating excitations from the RF devices and DPSs in BFNs and obtaining the corresponding M field signals from the M antenna elements' radiations at the selected fixed position, as shown in Step 103;

(d) inputting another set of digital control codes to the RF devices to produce another set of M field signals at the selected fixed position from the M antenna elements of each of the G sub-arrays, as shown in Step 104, wherein the M antenna elements can be identical to or different from each other;

(e) repeating Steps 101 to 104 and measuring signals M times to generate N field signals and find the N antenna error-calibrating signals associated with the RF paths in BFN, as shown in Step 105;

(f) inputting amplitude signals corresponding to the N antenna elements, as shown in Step 106, wherein the N antenna elements can be identical to or different from each other.

Figure 2:
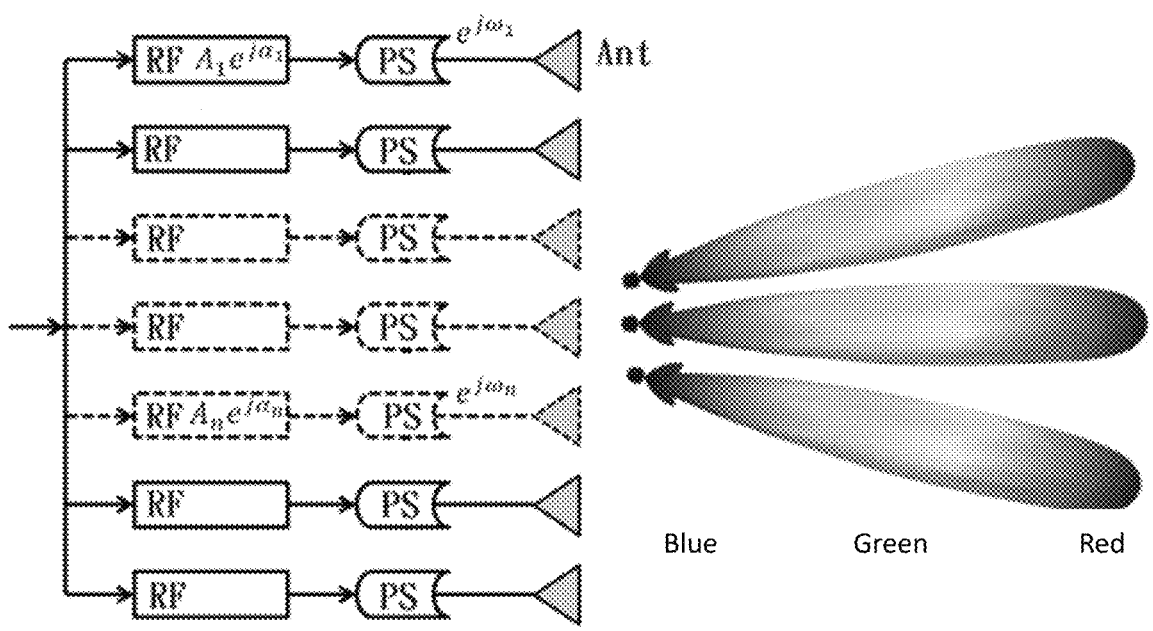
FIG. 2 is a schematic diagram illustrating a beam-scanning phased array of antennas using a calibration method for a phased array of antennas according to the present invention.

As illustrated in FIG. 2, the calibration method of the present invention is applied to N antenna elements for generating scanning beams. The antenna elements are excited by an active BFN to radiate directional or contour beams. The active BFN includes emitters, RF power amplifiers, DPS, attenuators, power dividers (not illustrated), and antennas Ant.

The theory for calibrating a 1-D phased array of antennas is described as follows. The single-observation field radiation pattern is represented by Formula (1). Note that the 1-D phased array of antennas can be a periodic or aperiodic array of antennas, and can be either conformal or planar.

$$\bar{F}(\bar{r}) = \Sigma_{n=0}^{N-1} I_n e^{i\varphi_n} \bar{F}_n(\bar{r}) \quad (1)$$

wherein, $\bar{r}=(r,\theta,\varphi)$ is in the spherical coordinate system. In Formula (1), $I_n$ and $\varphi_n$ represent the amplitudes and phases of excitations, generated from the BFN by its components including RF devices, DPSs and RF transmission lines, to excite the $n^{th}$ antenna element. The pattern function $\bar{F}_n(\bar{r})$ represents the contribution of radiation from the $n^{th}$ antenna element. In the far-zone of the array of antennas, $\bar{F}_n(r,\theta,\phi)$ is expressed as follows:

$$\bar{F}_n(r,\theta,\phi) = e^{i\bar{k}\cdot\bar{r}_n}\bar{P}_n(r,\theta,\phi)$$

$\bar{k}$ represents a wave vector of propagation, $\bar{r}_n$ represents the position vector of the $n^{th}$ antenna element, $\bar{P}_n(\theta,\varphi)$ represents the radiation field pattern of the $n^{th}$ antenna element when it is located at $\bar{r}_n=(0,0,0)$, the origin of coordinate system. For the measured position selected at $\bar{r}=\bar{r}_0=(r_0,\theta_0,\phi_0)$, the measured field radiation pattern is expressed as follows:

$$F_{co}(\bar{r}_0) = \sum_{n=0}^{N-1} I_n e^{i\varphi_n}(\bar{F}_n(\bar{r}_0)\cdot\hat{e}) \quad (2)$$

wherein, $\hat{e}$ represents a polarized vector in a co-polarized direction. $I_n$ also includes the amplitude error induced by a channel mismatch of RF paths in BFN in comparison to a uniform-amplitude excitation. $\varphi_n=\alpha_n+\omega_n$, wherein $\alpha_n$ represents a phase error introduced from a channel mismatch of RF path in BFN including fabrication errors, and RF devices distortions, and $\omega_n$ represents the phase of each antenna element generated by the DPSs 101.

The DPS 101 generates digital phase shifts with a step size of $\Delta=2\pi/M$ in response to digital codes by b-digits. $M=2^b$ represents the phase state number of the DPS. The digital phases may be represented by $\omega_{n,m}=-2\pi nm/M$. The measured field radiation pattern at the selected fixed position, $\bar{r}_0$, is expressed as follows:

$$F_{co}(m) = \sum_{n=1}^{N} (I_n e^{i\alpha_n}(\bar{F}_n(\bar{r}_0)\cdot\hat{e}))e^{-i2\pi(n-1)(m-1)/M} = \quad (3)$$

$$\sum_{n=1}^{N} (A_n e^{i\alpha_n})e^{-i2\pi(n-1)(m-1)/M}$$

wherein, $A_n=I_n(\bar{F}_n(\theta_0,\varphi_0)\cdot\hat{e})$ is an amplitude term incorporating the excitation amplitude, the radiation field patterns of the antenna elements and the amplitude errors in the RF path of the BFN. When M=N and the DPS 101 consecutively switches, the measured value $F_{co}(m)$ and the amplitude term $A_n$ of the N antenna elements in Formula (3) form a DFT relation.

In a general case, the phase state numbers M of the digital phase shifter does not equal the number N of the antenna elements. When N<M, degeneration of DPSs is considered by $\sup\{\gamma|\gamma\in\mathbb{N}, M_\gamma\equiv 2^{(b-\gamma)}\geq N\}$, where $M_\gamma$ is the new-defined phase state number of the digital phase shifter. When the new state number of the digital phase shifter 101 is equal to $M_\gamma$, the digital phase shifter 101 switches by a smaller bit number, b-$\gamma$. In such an operation, the quantization error can be minimized. The end of the array is added with virtual elements to build a DFT relation by making $M_\gamma$=N. Adding virtual elements is equivalent to put zero padding before performing DFT. When N>M, the number of antenna elements of the array of antennas is larger than the number of available phase states. The number of phase states is not sufficient to provide N field signals for calibration. This is a more complicated case. As a result, a sub-array decomposition is performed to form the array of N elements by G sub-arrays with each having M antenna elements. The calibration method is performed for the G subarrays simultaneously without turning off any antenna elements.

Figure 3:
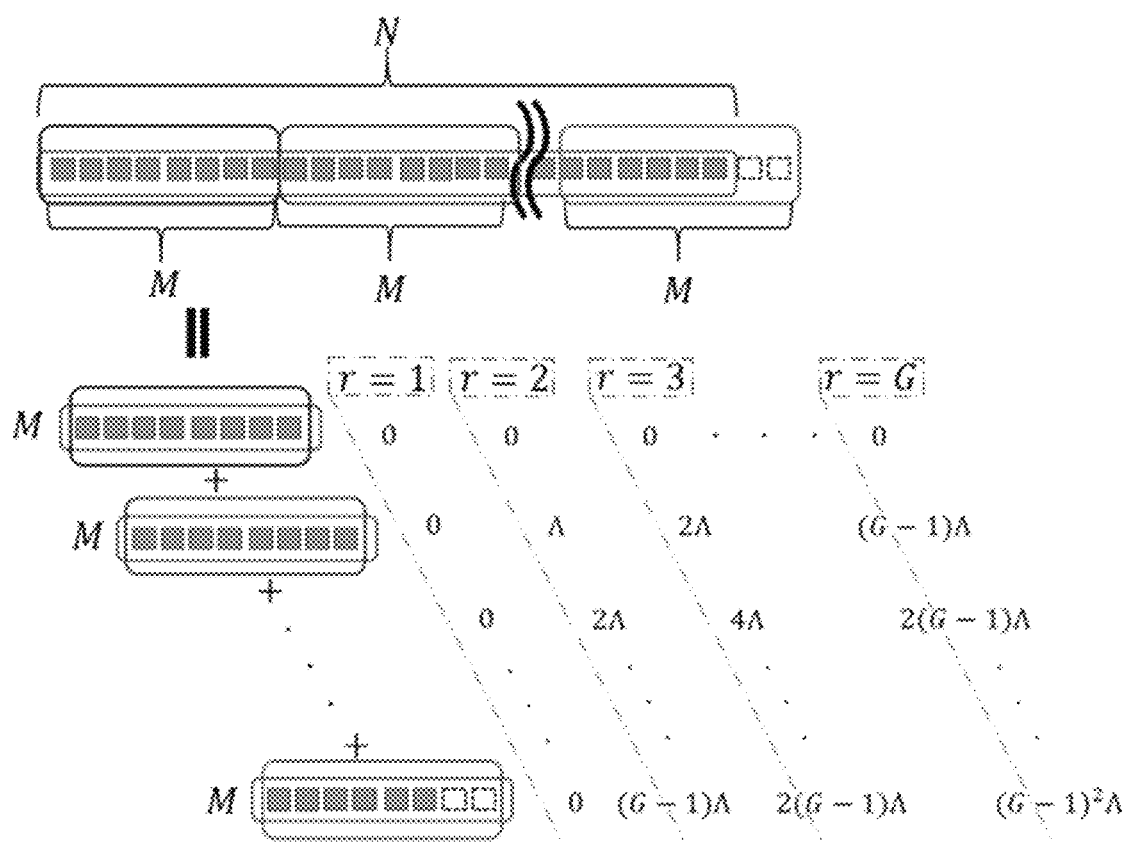
FIG. 3 is a schematic diagram illustrating a phased array of antennas decomposed into sub-arrays using a calibration method for a phased array of antennas according to the present invention.

FIG. 3 is a flowchart of the calibration method for a 1-D phased array of antennas after the re-organizing the indices of antenna elements. Referring to FIG. 3, the phased array of antennas consists of N antenna elements, and is decomposed into G sub-arrays. Each sub-array has M antenna elements. If N≠GM, then zero padding is performed in the subarrays to ensure the condition of N=GM by adding virtual antenna elements.

The calibration procedure is totally performed G times (r=1~G) in a sequential order, where each procedure provides M measured values to provide N=GM field signals measured at the selected position. In the first operation (r=1), each sub-array's antenna elements are excited to radiate field signals by using the phase $\omega_{p,g}$ (g represents the index of the G sub-arrays and p represents the index of the M antenna elements of the sub-array) thereof, so as to generate N↔N DFT terms between N antenna elements and N radiation field signals. The summed DFT complex signals of each sub-array are measured at the selected fixed position. During the second operation (r=2), the $g^{th}$ sub-array is excited by the added phases of the phase $\omega_{p,g}$ thereof and the corresponding phase shift (g−1)Λ generated by the digital phase shifter 101. This procedure is performed for all r from 1 to G. According to the linear characteristics of DFT, the following formula shows the relationship of measured signal, $F_{co}(q,r)$, with respect to the excitations at the fixed position during the $r^{th}$ operation.

$$F_{co}(q,r) = \sum_{g=1}^{G}\sum_{p=1}^{M}(A_{p,g}e^{i\alpha_{p,g}})e^{-i\left(\frac{2\pi}{M}(p-1)(q-1)\right)}e^{-i(r-1)(g-1)\Lambda} = \quad (4)$$

$$\sum_{g=1}^{G} e^{-i(r-1)(g-1)\Lambda}DFT\{A_{p,g}e^{i\alpha_{p,g}}\}$$

$$DFT\{\cdot\} \equiv \sum_{p=0}^{M-1}(\cdot)e^{-i2\pi pq/M} \quad (5)$$

The amplitude and phase errors of the $p^{th}$ antenna element of each sub-array is solved according to Formula (4) by solving $$\begin{bmatrix} 1 & 1 & 1 & \cdots & 1 \\ 1 & e^{-i\Lambda} & e^{-i2\Lambda} & \cdots & e^{-i(G-1)\Lambda} \\ 1 & e^{-i2\Lambda} & e^{-i4\Lambda} & & e^{-i2(G-1)\Lambda} \\ & & \vdots & & \\ 1 & e^{-i(G-1)\Lambda} & & & e^{i(G-1)^2\Lambda} \end{bmatrix} \begin{bmatrix} A_{p,1}e^{i\alpha_{p,1}} \\ A_{p,2}e^{i\alpha_{p,2}} \\ A_{p,3}e^{i\alpha_{p,3}} \\ \vdots \\ A_{p,G}e^{i\alpha_{p,G}} \end{bmatrix} = \tag{6}$$

$$IDFT\left\{\begin{bmatrix} F_{q,1} \\ F_{q,2} \\ F_{q,3} \\ \vdots \\ F_{q,G} \end{bmatrix}\right\}$$

$$IDFT\{\cdot\} \equiv \frac{1}{M}\sum_{q=0}^{M-1}(\cdot)e^{-i2\pi pq/M} \tag{7}$$

The precision and the complexity of the calibration method of the present invention are dependent of the calibration environment and the quantization errors of the digital phase shifter 101. The former generates quite unpredictable errors. Thus, an anechoic chamber with high quality is a better calibration environment. If the anechoic chamber with high quality is not used, a post-calibration procedure will be required to reduce stray signals from the environment. The error generated by the latter is the main purpose of the present invention. The quantization error of the digital phase shifter 101 is often characterized as the error of a root mean square (RMS) value. These errors are modeled as the perturbation terms of DFT.

$$DFT*\{\cdot\} \equiv \sum_{p=0}^{M-1}(\cdot)e^{-i2\pi pq/M}e^{i\delta_{pq}} \tag{8}$$

It assumes that phase deviations are expressed as follows:

$$\delta_{pq} \sim U[-\delta_{max}, \delta_{max}]$$

The phase deviations are uniformly distributed in an error bound $\delta_{max}$. As a result, when the inverse discrete Fourier transformation (IDFT) of Formula (8) is performed, the $p^{th}$ tracked value $\tilde{\alpha}_p$ is expressed as Formula (9):

$$\tilde{\alpha}_p = \sum_{q=1}^{M} C_{pq}\alpha_q, \tag{9}$$

wherein $C_{pq}$ is the coupling coefficient obtained from IDFT. When $\delta_{max}$ is approximate to 0 and p=q, $C_{pq}$ is approximate to 1. When p≠q, $C_{pq}$ is approximate to 0. In such a case, an ideal digital phase shifter is formed. However, when the quantization error of the digital phase shifter exists, $C_{pq}\neq 0$. All RF path channels of the BFN are coupled to each other. The contributions of other RF path channels cannot be not ignored. When the number of antenna elements of the sub-array is increased, the precision of the antenna elements will be decreased. It is explained by expressing the following equation.

$$e^{i\delta_{pq}} = \cos(\delta_{pq}) + i\sin(\delta_{pq}) = X_{pq} + iY_{pq}$$

It indicates that the random variables $X_{pq}$ and $Y_{pq}$ are not arranged in a uniform distribution but in an arcsine distribution. Thus, when the number of DFT matrixes is increased, the errors are accumulated. This is why the degeneration must be used in the calibration method when the number N of the antenna elements of the phased array of antennas is smaller than the number of phase states M provided by the DPSs. However, this is not a big problem. If the calibrated step number M is large, the error of the corresponding RMS phase is very small. On the other hand, when the number of the antenna elements, N, of the phased array of antennas is larger than M, the error caused by decomposing the phased array of antennas increases as the number of the antenna elements, N, increases.

The computational complexity of the calibration method of the present invention depends on the operation of IDFT over the measured field signals for decomposing the array of antennas' field signals into the measured values of the sub-arrays and the inverse matrix in Formula (6). In order to perform IDFT, the fast Fourier transformation algorithm is used to reduce the order of computation complexity, such that the original complexity $O(GM^{2d})$ is reduced to $O(GM^d \log_2 M^d)$. Formula (6) represents the Vandermonde matrix. When the array is 1-D, then d=1. When the array is 2-D, then d=2. When the array is decomposed, the inverse matrix is solved by M times, which has the additional computing complexity of $O(G^2M)$. In such a case, the matrix is also the Vandermonde matrix.

Figure 4:
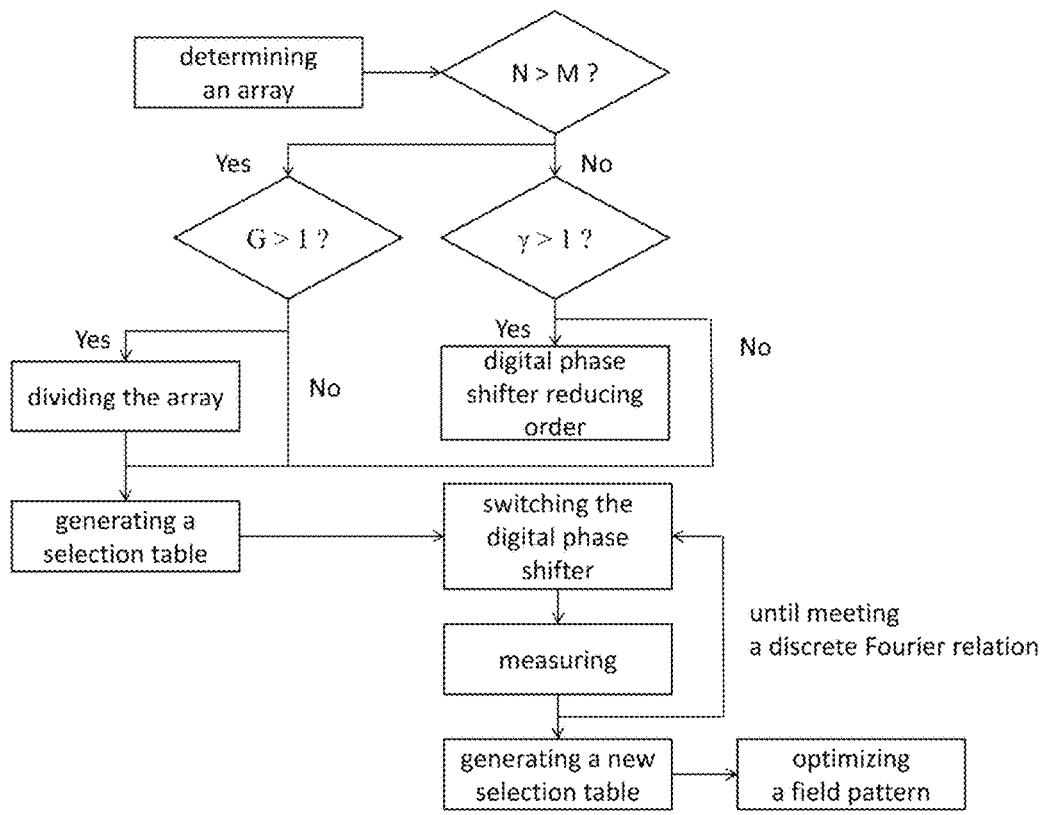
FIG. 4 is a flowchart of the procedure of a calibration method for a phased array of antennas according to the present invention.

The calibration flowchart for the phased array of antennas is illustrated in FIG. 4. It starts with providing the characteristics of the phased array of antennas to the calibration codes including the number N of antenna elements, and the calibrated step number M of the digital phase shifter 101. Then, the calibration procedure determines whether to decompose the array or degenerate a digital phase shift based on the relation between the number N of the antenna elements and the phase state number M of the DPSs. These parameters are the given values of the calibration procedure. After setting these given values, a selection table of digital control codes is generated to control the RF devices, and is used to indicate the various measuring states. When all measurements are completed, DFT signal data have been collected. The data includes all phases and amplitudes of DFT signals measured at a single position.

Thus, the excitation amplitude and the phase of each array element are obtained under the condition of initial zero states for the DPSs. These extracted values of excitation amplitudes and phases are considered as the error-calibrating signals for the BFN's RF devices with respect to the ideal situations of uniform amplitudes and zero phases for the maximum directivity of the array of antennas' radiation at the selected measurement position. Thus, after calibration, a new amplitude and phase selection table is generated for the RF devices and DPSs in the BFN to compensate before they are operated to radiate directional beams. On the other hand, the phases in this table can be used to serve as the new initial states for the DPSs at its zero states along this calibration procedure. These zero states has been already incorporated with the phase error of each RF path channel in BFN including the effect of antenna elements' radiations at the measurement position (in general, it is selected at the boresight of the array of antennas), which is equivalent to the phase distribution of boresight radiation. The amplitudes in the table are regarded as the amplitudes of the RF devices in BFN in their setup states. Accordingly, the new selection table may be used to optimize the radiation field pattern.

In addition to its capability to recover the amplitude and phase errors in the BFN with respect to the initial states set for the RF devices and DPSs in the BFN, the procedure can be also used to calibrate the binarily discretized output states of the RF devices and DPSs in the BFN by considering same offsets at each state. To achieve this calibration of output states for RF devices and DPSs in BFN, the calibration procedure is re-performed by setting a set of new initial states to the next level to recover a new set of amplitudes and phases. This sequential calibration thus recover all amplitude and phase states for the RF devices and DPSs with same offset to the fixed fabrication errors.

Figure 5:
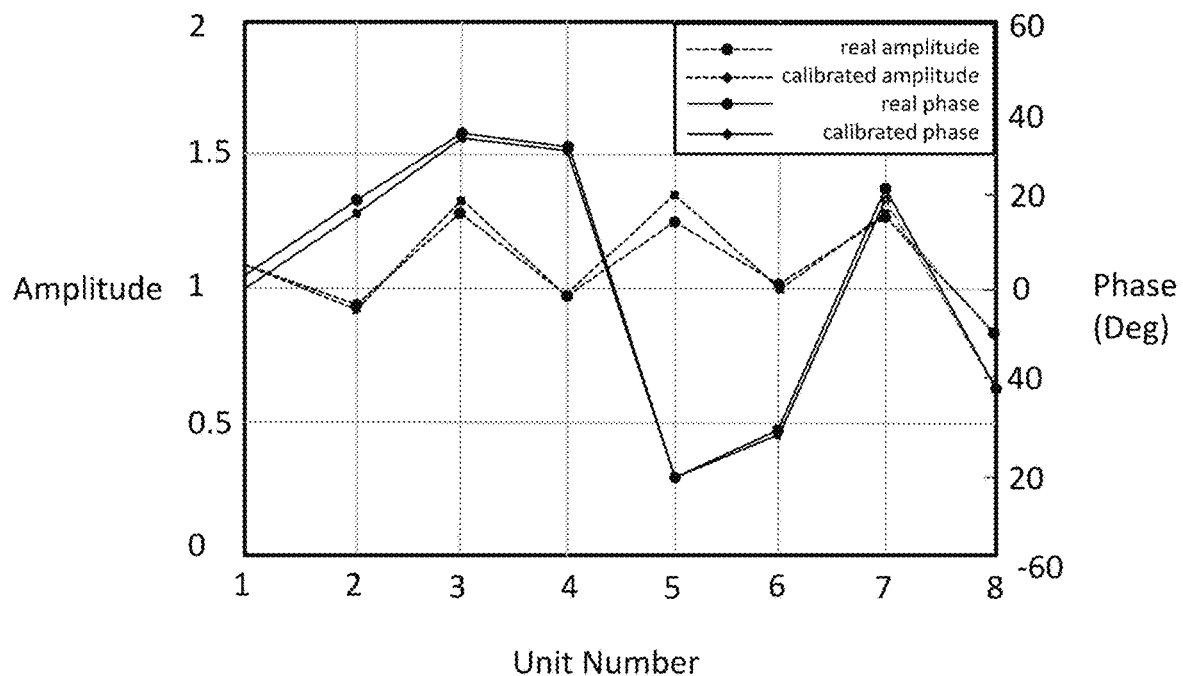
FIG. 5 is a diagram illustrating the calibrated values (i.e., the extracted error-calibrating signals) and the given values of amplitudes and phases (i.e., the existing errors) using a calibration method for a 1-D phased array of antennas according to a first embodiment of the present invention.
Figure 6:
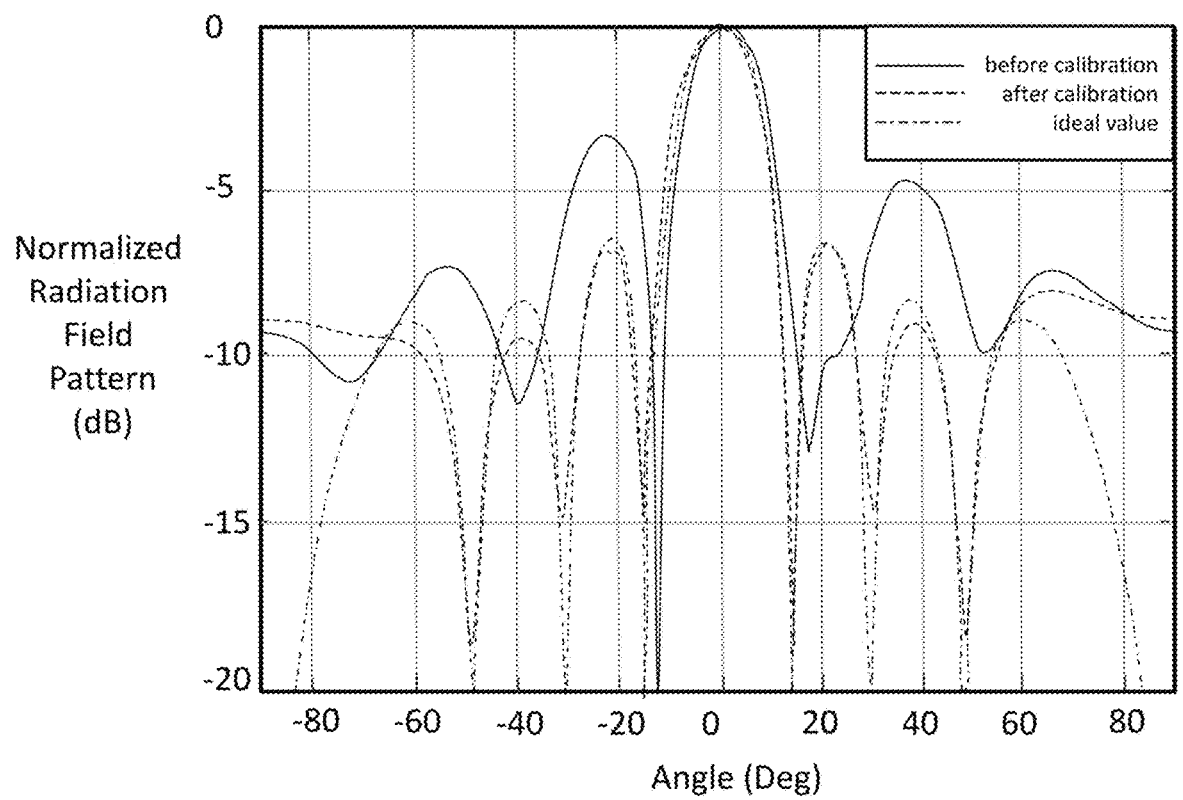
FIG. 6 is a diagram illustrating a radiation field pattern before calibration and a radiation field pattern after calibration using a calibration method for a phased array of antennas according to the first embodiment of the present invention.

FIG. 5 is a diagram illustrating the calibrated values (e.g. error-calibrating signal) and the given values of amplitudes and phases using a calibration method for a 1-D phased array of antennas according to a first embodiment of the present invention. In the embodiment, the 1-D phased array of antennas includes eight antenna elements equipped with DPSs of a 6-bit digital output phase discretization (i.e., 64 phase states). The number N=8 of the antenna elements is less than the state number M=64 (i.e., the total state number) of the DPSs. According to the calibration flowchart in FIG. 4, the phase discretization of digital phase shifter is degenerated. The simulated results are illustrated in FIG. 5 and FIG. 6. FIG. 5 shows the calibrated results and the given values of the phases and the amplitudes, wherein the calibrated results correspond to the given values. After virtual calibration, a new selection table is generated and the antenna elements are calibrated to have the same phases. FIG. 6 is a diagram illustrating a radiation field pattern before calibration and a radiation field pattern after calibration according to the first embodiment. Before calibration, the phase error of the radio-frequency (RF) channel causes the phased array of antennas to have a higher sidelobe level (SLL). Besides, the direction of the main beam slightly deviates from the boresight. After calibration, the phased array of antennas and the main beam comply with the case of theoretically ideal states.

Figure 7:
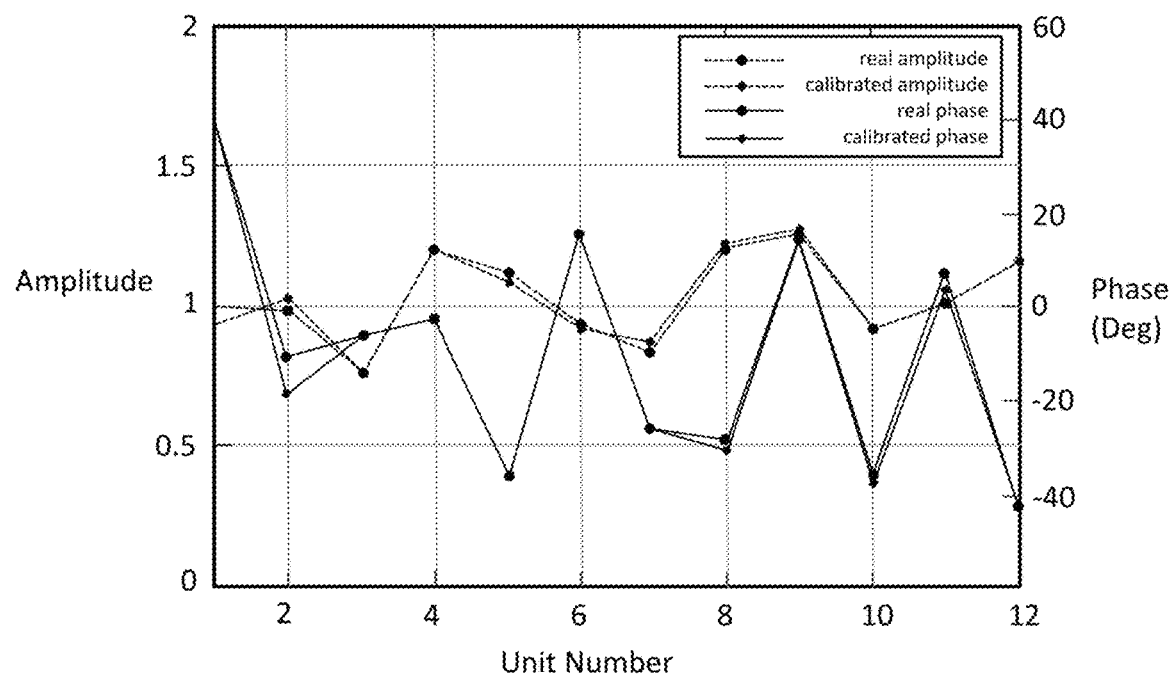
FIG. 7 is a diagram illustrating the calibrated values (i.e., the extracted error-calibrating signals) and the given values of amplitudes and phases (i.e., the existing errors) using a calibration method for a 1-D phased array of antennas according to a second embodiment of the present invention.
Figure 8:
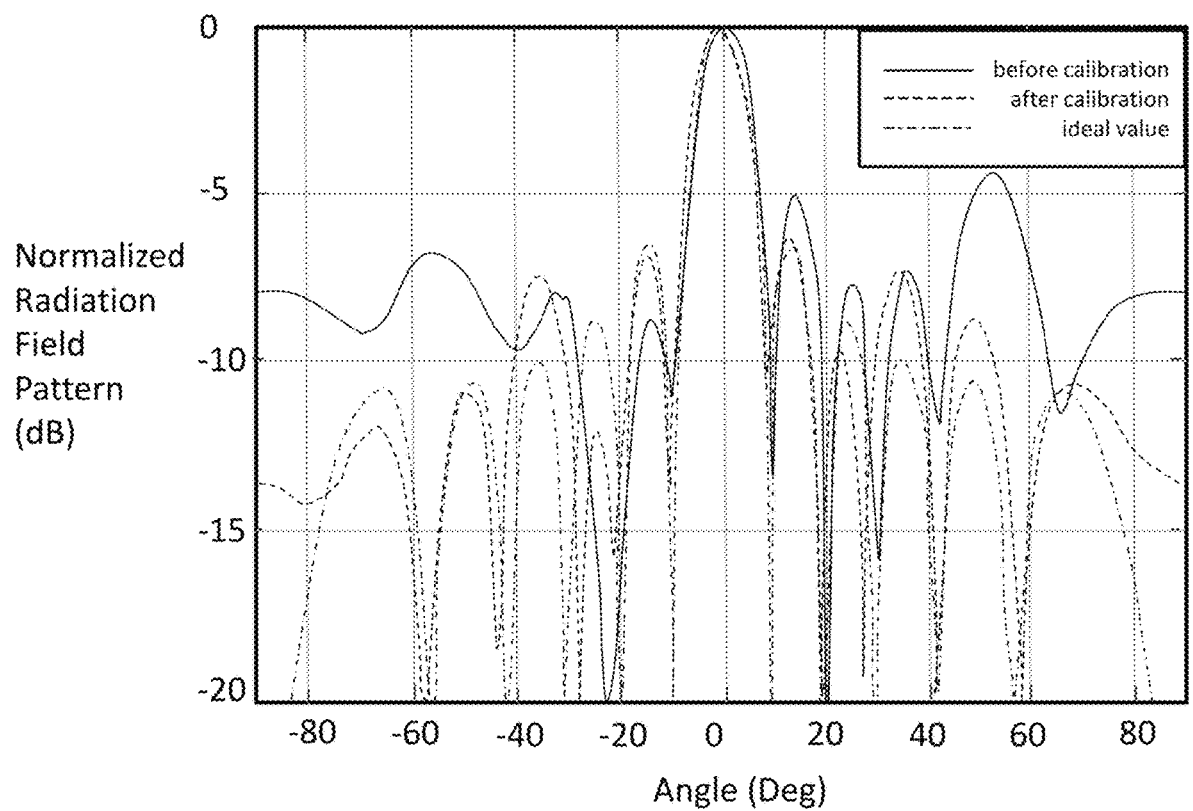
FIG. 8 is a diagram illustrating a radiation field pattern before calibration and a radiation field pattern after calibration using a calibration method for a phased array of antennas according to the second embodiment of the present invention.

FIG. 7 is a diagram illustrating the calibrated values and the given values of amplitudes and phases using a calibration method for a 1-D phased array of antennas according to a second embodiment of the present invention. FIG. 8 is a diagram illustrating a radiation field pattern before calibration and a radiation field pattern after calibration according to the second embodiment. In the embodiment, the 1-D phased array of antennas includes twelve antenna elements equipped with a 3-bit digital phase shifter (i.e., providing 8 phase states). The number N=12 of the antenna elements is larger than the state number M=8 (i.e., the phase state number) of the digital phase shifter. According to the calibration flowchart in FIG. 4, the phased array of antennas is decomposed.

Figure 9:
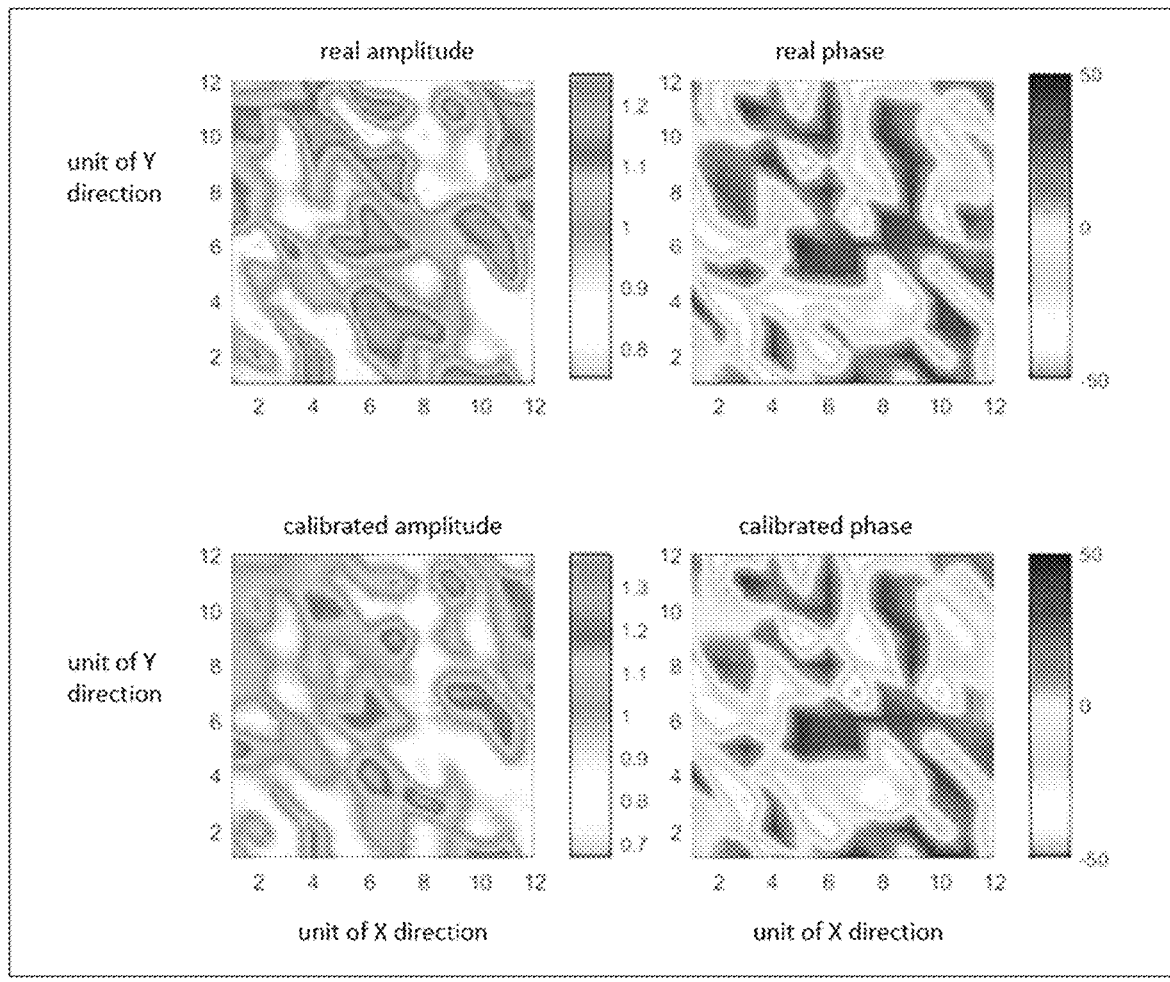
FIG. 9 is a diagram illustrating the calibrated values (i.e., the extracted error-calibrating signals) and the given values of amplitudes and phases (i.e., the existing errors) using a calibration method for a 2-D phased array of antennas according to a third embodiment of the present invention.

FIG. 9 is a diagram illustrating the simulated results of amplitudes and phases using a calibration method for a 2-D phased array of antennas according to a third embodiment of the present invention. The 2-D phased array includes 12×12 antenna elements equipped with a 3-bit digital phase shifter (i.e., providing 8 phase states). Note that the 2-D phased array of antennas can be a periodic or aperiodic array of antennas, and can be a conformal or planar array of antennas.

Figure 10A:
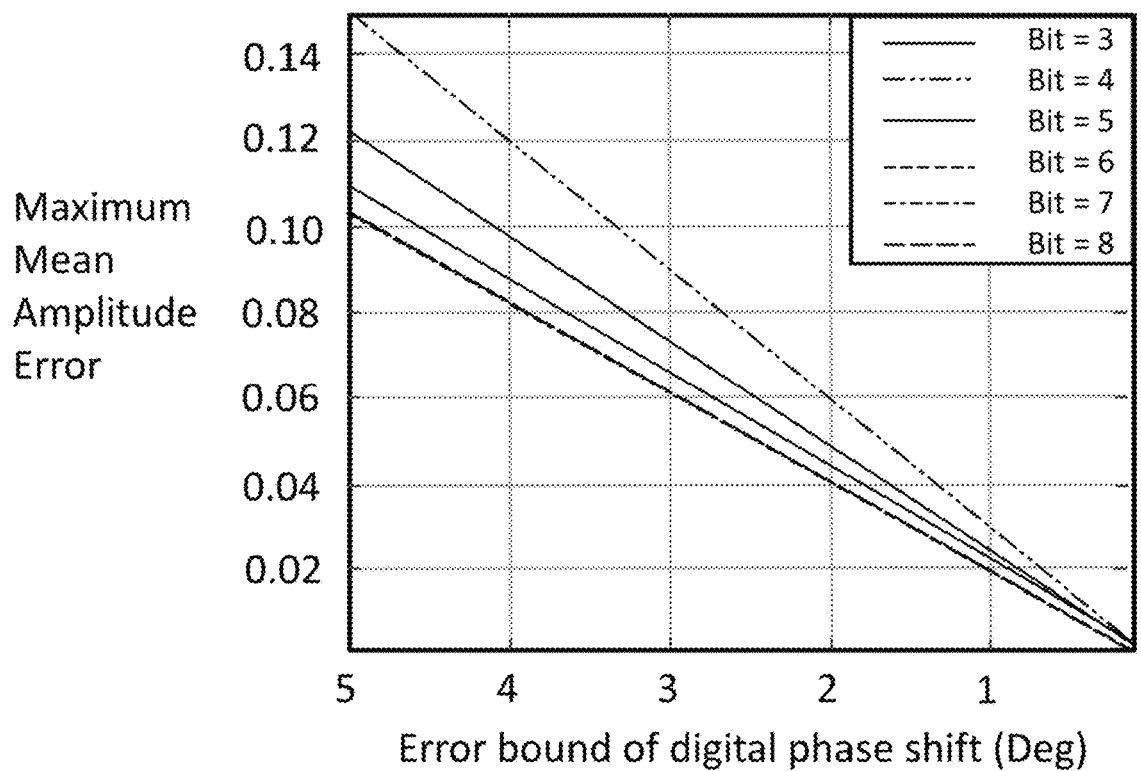
FIGS. 10(*a*)-10(*b*) are diagrams illustrating the curves of phase errors and amplitude errors versus the error bounds of the different bit numbers of DPSs using a calibration method for a phased array of antennas according to the present invention.
Figure 10B:
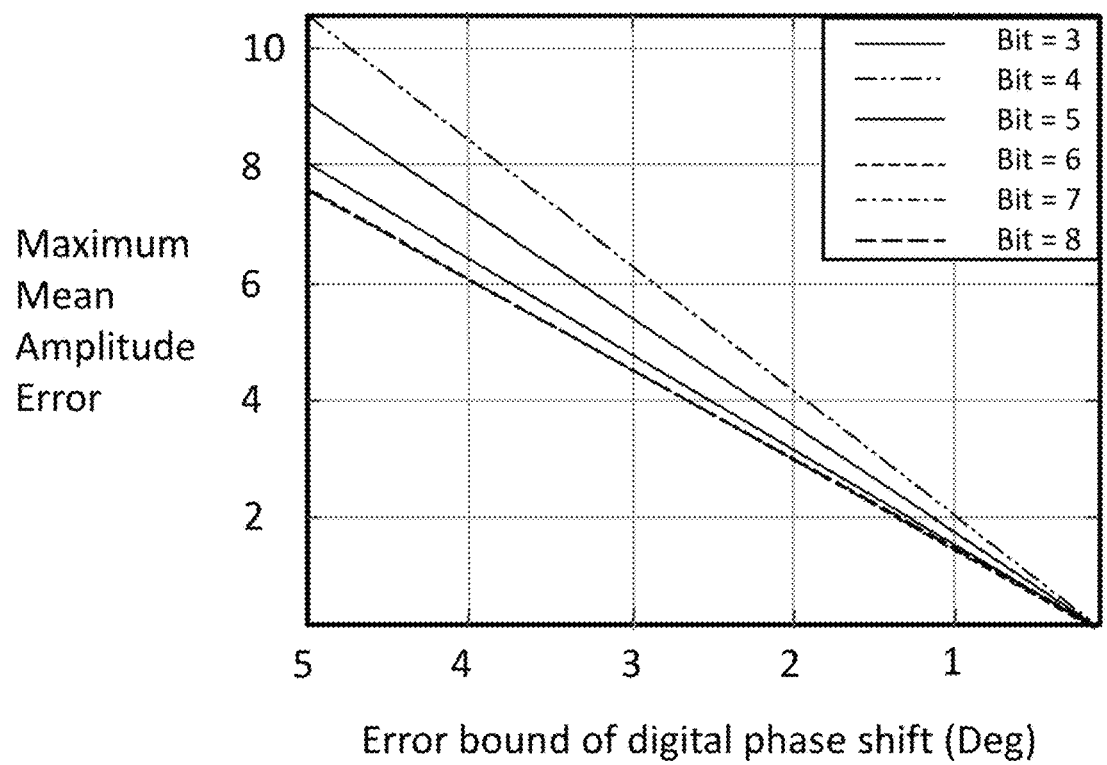

The quantization error of the digital phase shifter is very important to the calibration precision. FIGS. 10(a)-10(b) are diagrams illustrating the curves of phase errors and amplitude errors versus the error bounds when the DPSs' phase states are discretized by different bit numbers. The calibration method uses a 1-D phased array of 64 antennas for test. The 1-D phased array of antennas is excited by either a 3-bit digital phase shifter, a 4-bit digital phase shifter, a 5-bit digital phase shifter, a 6-bit digital phase shifter, a 7-bit digital phase shifter or an 8-bit digital phase shifter. Each test is simulated 10000 times. The maximum mean amplitude error and the maximum mean phase error are obtained from the absolute values of the calibrated values and the computed values. The linear relation can be observed from the maximum mean amplitude error and the maximum mean phase error. The calibrated error decreases as the error bound of the digital phase shifter decreases. When the error bound of the digital phase shifter approaches zero and the environment-calibrating factor is ignored, the digital phase shifter becomes more ideal and the calibrated error approaches zero.

It is observed that the mean amplitude error and the mean phase error of the array excited by a 3-bit digital phase shifter are relatively lower than the mean amplitude error and the mean phase error of the array equipped with a 4-bit digital phase shifter when the error bound of the digital phase shifter is fixed. As a result, the trade-off between the parameters and the precision has to be taken in account.

As illustrated in FIG. 10(a) and FIG. 10(b), when the bit number of the digital phase shifter is higher than 6, the error curves almost overlap on each other owning to the degeneracy of the digital phase shifter, $M_\gamma=N=64$. Table 1 shows the mean amplitude error and the mean phase error corresponding to the different bit numbers of the DPSs when the error bound $\delta_{max}$ of the digital phase shifter is equal to 5.

TABLE 1

| Bit number | $N_{ps}$ | G | Mean Amplitude Error | Mean Phase Error |
|---|---|---|---|---|
| 3 | 8 | 8 | 0.1220 | 9.1252° |
| 4 | 16 | 4 | 0.1503 | 10.6356° |
| 5 | 32 | 2 | 0.1095 | 7.9586° |
| 6 | 64 | 1 | 0.1035 | 7.6452° |

Figure 11A:
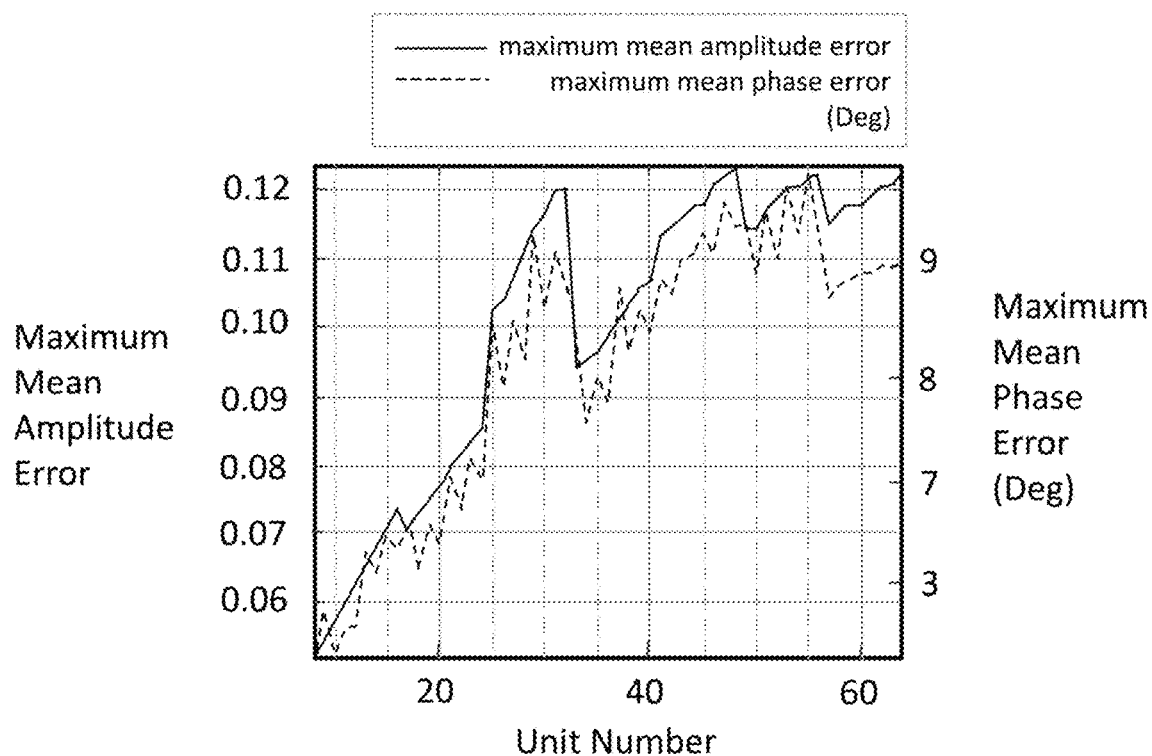
FIGS. 11(*a*)-11(*b*) are diagrams illustrating the curves of the increased step number and the number of antenna elements versus the precision using a calibration method for a phased array of antennas according to the present invention.
Figure 11B:
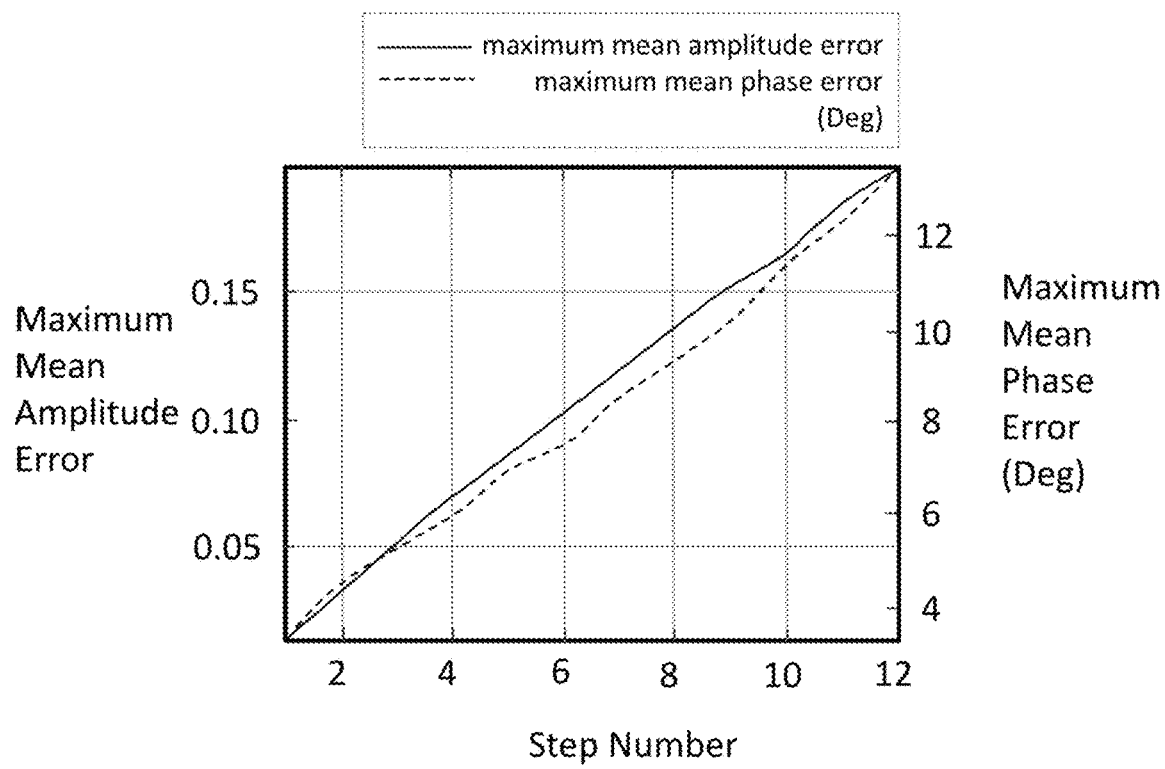

FIGS. 11(a)-11(b) are diagrams respectively illustrating the curves of the increased phase state number and the number of antenna elements versus the precision. These results are the simulation mean results of 10000 tests. As illustrated in FIG. 11(a), the digital phase shifter has 3 bits, the error bound $\delta_{max}$ is 5 degrees, and the number of the antenna elements varies from 8 to 64. From the simulated results, it is observed that the calibrated error bound increases as the number of the antenna elements increases, indicating insufficient phase resolution from the DPSs to operate the array of antennas. As illustrated in FIG. 11(b), the number of groups is fixed to one, the phase state number is M, and the bit number of the digital phase shifter changes from 20 to 12. The error is linear to the bit number in FIG. 11(b), which is contrary to the abovementioned situation.

Figure 12A:
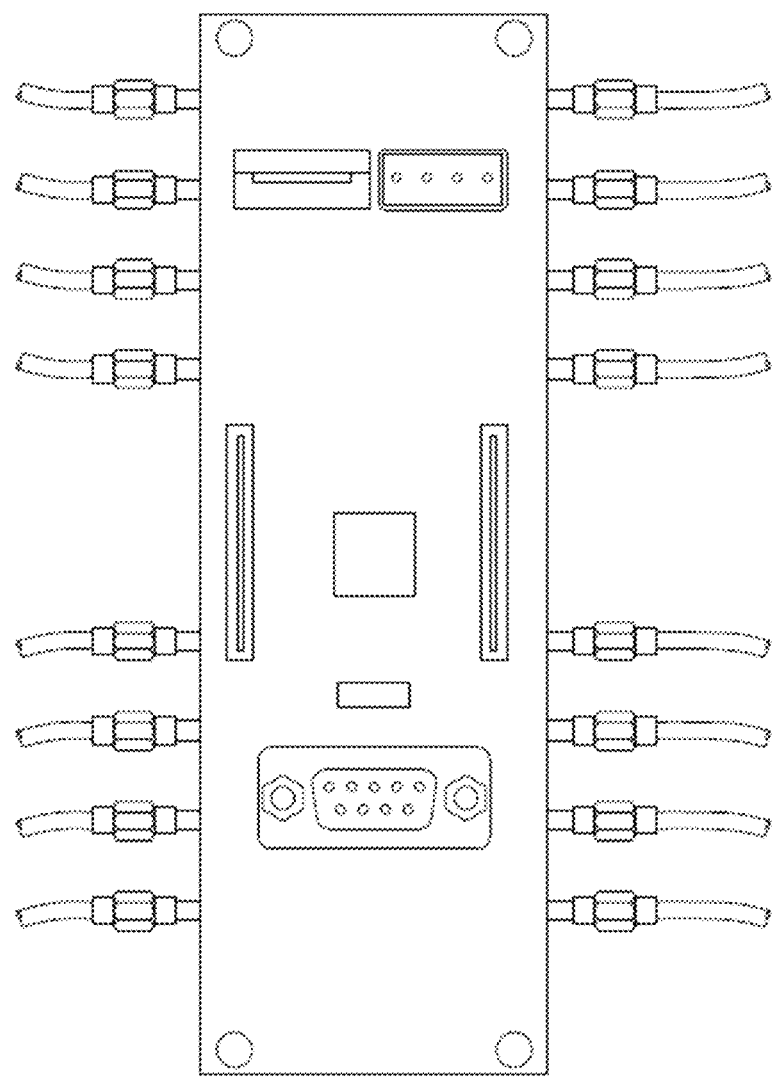
FIG. 12(*a*)-12(*c*) are diagram illustrating the entities of a digital phase shifter and an array of antennas using a calibration method for a phased array of antennas according to the present invention.
Figure 12B:
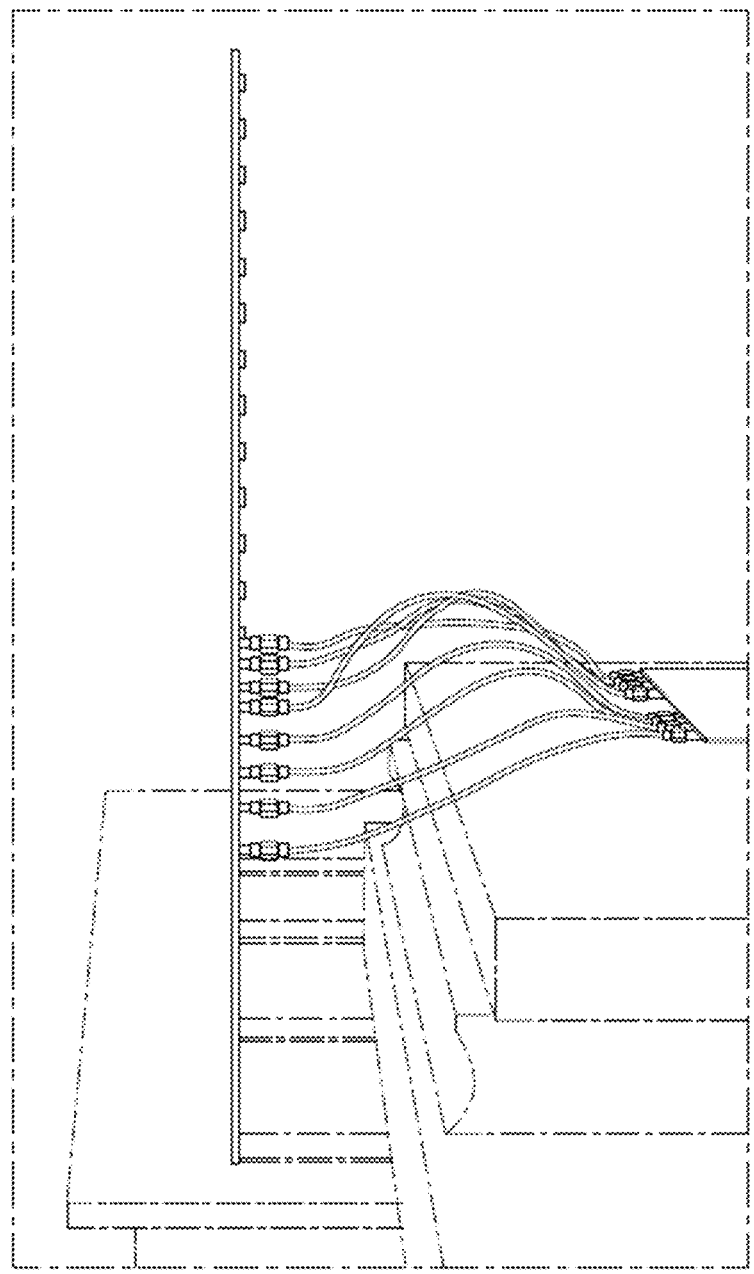
Figure 12C:
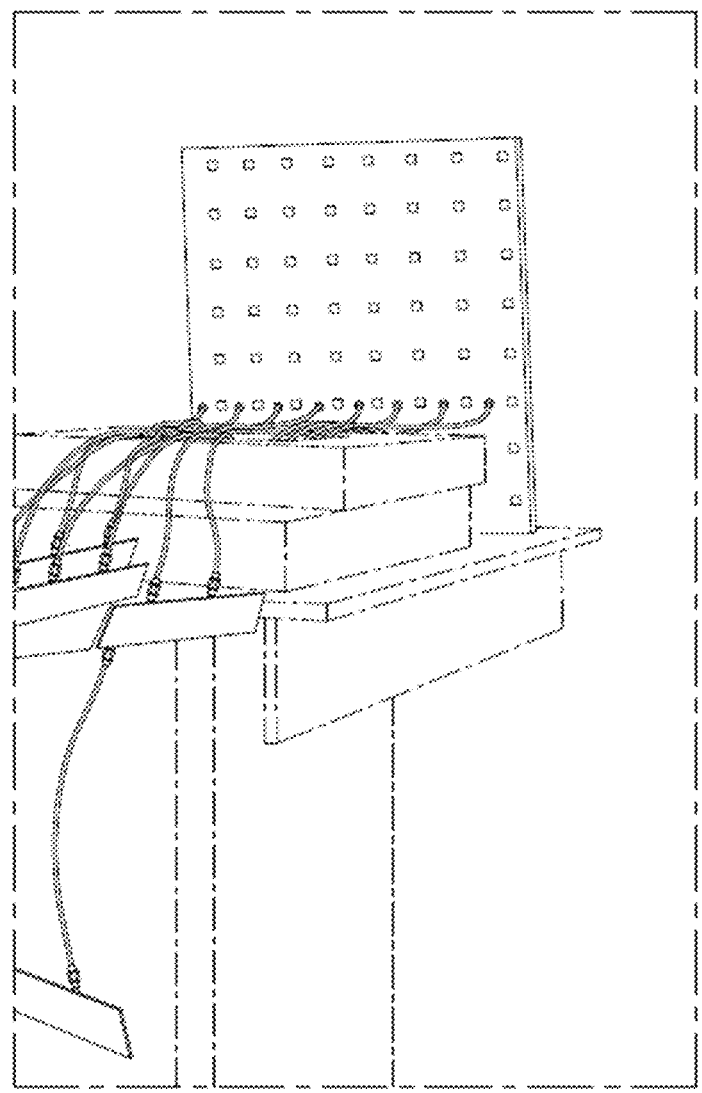

FIG. 12(a)-12(c) are diagram illustrating the entities of a digital phase shifter and an array of antennas.

Figure 13:
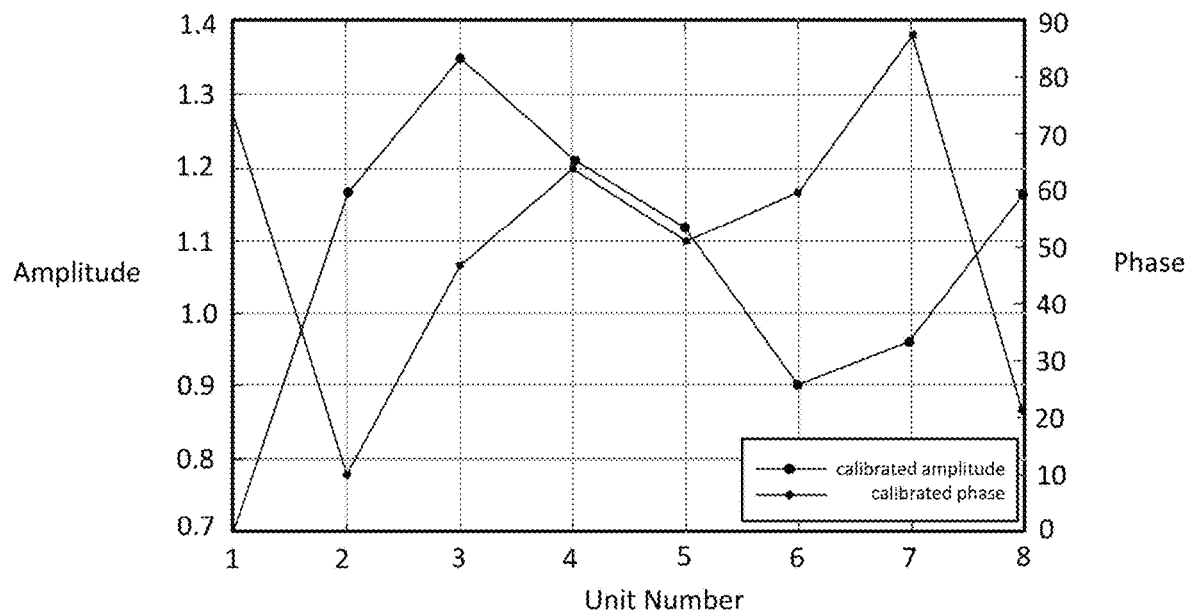
FIG. 13 is a diagram illustrating tracked amplitudes and phases measured in a far zone of an array of antennas using a calibration method for a phased array of antennas according to the present invention.

FIG. 13 is a diagram illustrating tracked amplitudes and phases measured in a far field.

Figure 14:
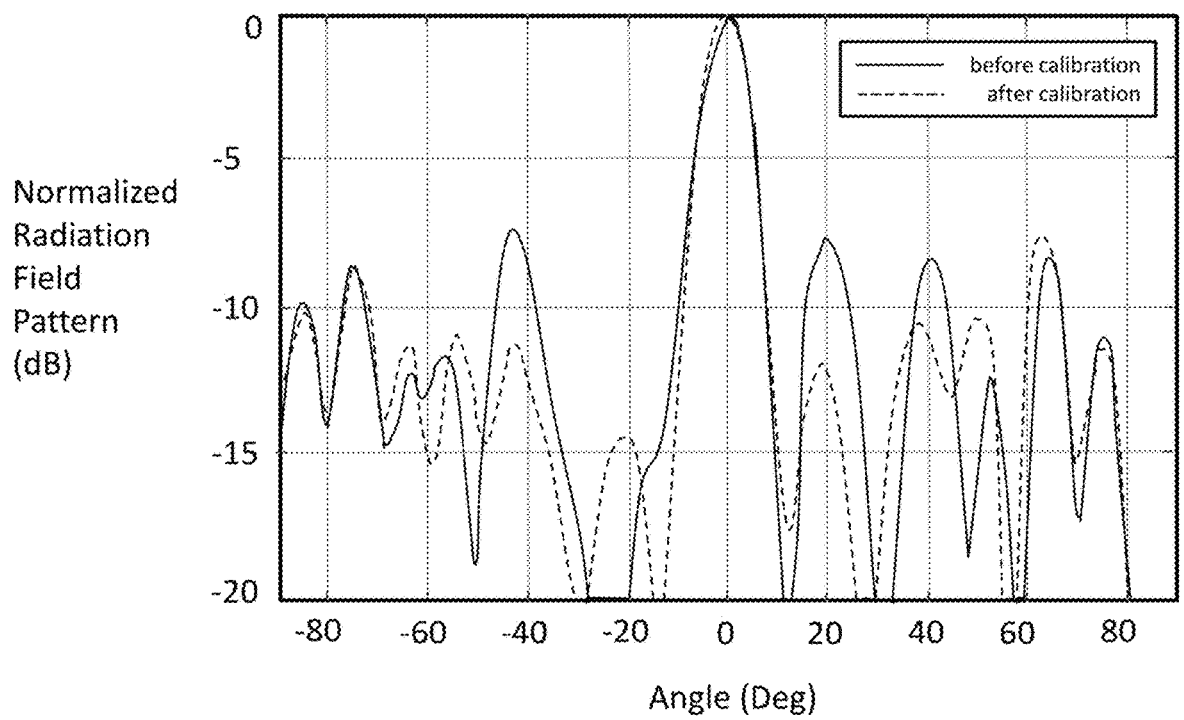
FIG. 14 is a diagram illustrating a radiation field pattern before calibration and a radiation field pattern after calibration using a calibration method for a phased array of antennas according to the present invention.

FIG. 14 is a diagram illustrating a radiation field pattern before calibration and a radiation field pattern after calibration.

Compared with the other conventional technologies, the calibration method for the phased array of antennas of the present invention has the following advantages:

(1) The present invention is applied to the operations of digital phase shifter. The output phases of the phase shifter are digitalized to provide the same phases and the same step sizes. The single-observation field radiation data and the excitation data of the antenna elements by DPSs meet a Fourier transformation relation. Thus, the DFT can calibrate the array of antennas, such that the radiation source in the co-polarized far field has the same phases along a boresight direction at the selected position of measurement. Accordingly, the digital phase shifter stores the error-calibrated phases as beam-scanning reference values.

(2) The advantage of the present invention is that the processing speed of electronic beam scanning is greatly faster than that of mechanical probe scanning.

(3) The present invention provides a beam-scanning phased array of antennas. The fast Fourier transformation algorithm decomposes the antenna elements into the sub-arrays to calibrate multiple antennas simultaneously, thereby reducing the complexity for computing phase errors.

The embodiments described above are only to exemplify the present invention but not to limit the scope of the present invention. Therefore, any equivalent modification or variation according to the shapes, structures, features, or spirit disclosed by the present invention is to be also included within the scope of the present invention.

What is claimed is:

1. A calibration method for a phased array of antennas suitable for a beamforming network (BFN) formed by components comprising radio frequency (RF) devices, wherein the RF devices are divided into active gain control units and digital phase shifters (DPSs), wherein the phased array of antennas includes N antenna elements, the N antenna elements are decomposed into G sub-arrays, each of the G sub-arrays includes M antenna elements, and the calibration method comprises:
   (a) inputting a set of digital control codes to the RF devices with binarily discretized output states of the active gain control units and the DPSs in the BFN to generate a set of excitation amplitudes and phases from the BFN with respect to a $r^{th}$ step in a sequential operation order for the G sub-arrays, and produce a set of field signals measured from the M antenna elements' radiations;
   (b) measuring the field signals of the M antenna elements' radiations with respect to the $r^{th}$ step in the sequential operation order at a selected fixed position to produce a discrete Fourier transformation (DFT) relationship with respect to the RF devices' operations; and
   (c) repeating operations (a) to (b) corresponding to the operation step order r in the sequential operation order from 1 to G for generating excitations from the RF devices and the DPSs in the BFN and obtaining the corresponding field signals of the N antenna elements.

2. The calibration method for the phased array of antennas according to claim 1, wherein the field signals are far field signals or near field signals.

3. The calibration method for the phased array of antennas according to claim 1, wherein the phased array of antennas is a one-dimensional array of antennas.

4. The calibration method for the phased array of antennas according to claim 1, wherein the phased array of antennas is a two-dimensional array of antennas or a three-dimensional array of antennas.

5. The calibration method for the phased array of antennas according to claim 1, wherein the phased array of antennas is conformal or planar shaped.

6. The calibration method for the phased array of antennas according to claim 1, further comprising:
   (d) inputting another set of digital control codes to the RF devices to produce another set of field signals to the M antenna elements of each of the G sub-arrays; and
   (e) repeating operations (a) to (d) and measuring signals M times to generate N antenna field signals and N antenna error-calibrating signals.

7. The calibration method for the phased array of antennas according to claim 6, wherein the N antenna error-calibrating signals are re-defined as the initial states of the RF devices and DPSs in their operational tables of the discrete output states.

8. The calibration method for the phased array of antennas according to claim 6, further comprising (f) inputting amplitude signals corresponding to the N antenna elements, wherein the N antenna elements can be identical to or different from each other.

9. The calibration method for the phased array of antennas according to claim 8, wherein the amplitude signals corresponding to the N antenna elements in operation (f) are represented with $A_{p,g}$, p represents an index of the antenna element, (M−1) is an integer, and g represents an index of the sub-array.

10. The calibration method for the phased array of antennas according to claim 1, wherein the DFT signal corresponding to the M antenna elements of the G sub-arrays in operation (b) is represented with $$\exp\left(-i\frac{2\pi}{M}(p-1)(q-1)\right),$$

p represents an index of the M antenna elements.

11. The calibration method for the phased array of antennas according to claim 1, wherein the DFT signal corresponding to the operation order r to the G sub-arrays in operation (c) is represented with $\exp(-i(r-1)(g-1)\Lambda)$, g represents an index of the sub-array, G is an integer, $\Lambda$ represents a phase difference among the G sub-arrays, $\Lambda=(M/2-1)\Delta$, and $\Delta=2\pi/M$.

12. The calibration method for the phased array of antennas according to claim 1, wherein the phase of error-calibrating signals corresponding to the G sub-arrays in operation (e) are represented with $e^{i\alpha_{p,g}}$, p represents an index of the M antenna element, g represents an index of the G sub-array, and G is an integer.

13. The calibration method for the phased array of antennas according to claim 1, wherein the field signals of the N antenna elements corresponding to the operation order r are measured in a fixed position in operation (d) are represented with $$F_{co}(q, r) = \sum_{g=1}^{G}\sum_{p=1}^{M}(A_{p,g}e^{i\alpha_{p,g}})e^{-i\left(\frac{2\pi}{M}(p-1)(q-1)\right)}e^{-i(r-1)(g-1)\Lambda}.$$

14. The calibration method for the phased array of antennas according to claim 1, wherein M is determined by the number of phase states provided by DPSs.

\* \* \* \* \*